United States Patent
Taylor

(10) Patent No.: US 8,191,366 B2
(45) Date of Patent: Jun. 5, 2012

(54) CHARGE AIR COOLER CONDENSATE SEPARATION AND DISPERSION SYSTEM

(75) Inventor: Dwayne Robert Taylor, Livonia, MI (US)

(73) Assignee: DENSO International America, Inc., Southfield, MI (US)

(*) Notice: Subject to any disclaimer, the term of this patent is extended or adjusted under 35 U.S.C. 154(b) by 608 days.

(21) Appl. No.: 12/403,968

(22) Filed: Mar. 13, 2009

(65) Prior Publication Data

US 2010/0229549 A1 Sep. 16, 2010

(51) Int. Cl.
*F02B 33/44* (2006.01)
*F02B 29/04* (2006.01)
*F02B 33/00* (2006.01)
*F02M 15/00* (2006.01)

(52) U.S. Cl. .......... 60/599; 60/605.2; 123/542; 123/563
(58) Field of Classification Search .................... 60/599, 60/605.2; 123/585, 542, 563; 165/158
See application file for complete search history.

(56) References Cited

U.S. PATENT DOCUMENTS

| | | | |
|---|---|---|---|
| 6,301,887 B1 * | 10/2001 | Gorel et al. | 60/605.2 |
| 6,748,741 B2 | 6/2004 | Martin et al. | |
| 7,125,439 B2 * | 10/2006 | Bennett | 95/268 |
| 7,251,937 B2 | 8/2007 | Appleton | |
| 2007/0006571 A1 * | 1/2007 | Vetrovec | 60/281 |
| 2007/0107425 A1 * | 5/2007 | Appleton | 60/599 |
| 2007/0137590 A1 * | 6/2007 | Vetrovec | 123/25 A |
| 2007/0164751 A1 * | 7/2007 | Parachini et al. | 324/557 |
| 2008/0256975 A1 * | 10/2008 | Lifson et al. | 62/510 |

* cited by examiner

Primary Examiner — Quyen Leung
Assistant Examiner — Jose Gonzalez Quinones
(74) Attorney, Agent, or Firm — Harness, Dickey & Pierce, PLC

(57) ABSTRACT

A system for separating and dispersing condensate formed in a charge air cooler of a turbocharged engine system. The system includes a drain tube on the charge air cooler lower surface that is plumbed to a reservoir, with a charge air recirculation tube plumbed from the reservoir to the turbocharger compressor inlet duct. The pressure difference between the charge air cooler and the compressor inlet draws any condensate formed in the charge air cooler back into the reservoir. A valve at the bottom of the condensate reservoir will open under predetermined vehicle operating conditions to drain the stored condensate out from the reservoir. The condensate could be simply drained to the ground, or a spray bar could be connected to the reservoir outlet to spay the condensate on to the outside surface of the charge air cooler, providing additional performance for brief periods of high engine load operation.

19 Claims, 3 Drawing Sheets

CHARGE AIR COOLER CONDENSATE SEPARATION AND DISPERSION SYSTEM

FIELD

The present disclosure relates to removing condensate from charge air coolers.

BACKGROUND

This section provides background information, which is not necessarily prior art, related to the present disclosure. Charge air coolers are used with engines on vehicles to cool air that has been compressed and thus heated, relative to ambient temperature, by a turbocharger. In the process of cooling the air stream, moisture in the air condenses and then collects in the charge air cooler when humidity levels are relatively high and the engine is operating with the throttle partially open. The vapor, having condensed to liquid, may be drawn into the intake of the engine when the throttle opening increases from partial to fully open, for example. Liquid in the intake and in the intake air may cause misfiring or unstable combustion in the combustion chamber of the engine.

Referring now to FIG. 1, a turbocharged engine system 10 is depicted according to the prior art. The turbocharged engine system 10 includes an air intake filter housing 12, a turbocharger 14, a charge air cooler 16, and an engine 18. The turbocharger 14 includes a compressor 24 for supplying combustion air to an air intake of the engine 18 and a turbine 22 connected to the compressor 24 with a shaft. The turbine 22 receives exhaust gases from the engine 18 and drives the compressor 24, which compresses the intake air. The charge air cooler 16 receives the compressed air from the compressor 22 of the turbocharger 14 and cools the air as it passes therethrough. Condensate 26 then collects in the charge air cooler 16 and can be drawn into the engine 18, which is undesirable, because condensate from the charge air cooler 16 fouls combustion.

SUMMARY

This section provides a general summary of the disclosure, and is not a comprehensive disclosure of its full scope or all of its features. The disclosure describes a system for separating and dispersing condensate formed in a charge air cooler of a turbocharged engine system. The charge air cooler includes a condensate drain that is in communication with a condensate reservoir having a condensate inlet, a condensate outlet, and a charge air recirculation outlet. A condensate supply tube connects the charge air cooler to the condensate reservoir. The condensate supply tube has a first end that is connected to the condensate drain of the charge air cooler and a second end that is connected to the condensate inlet of the condensate reservoir. A condensate dispersion tube is connected to the condensate outlet of the condensate reservoir. The condensate dispersion tube has an inner surface and an outer surface that defines a circumferential wall that defines a plurality of apertures in communication with the inner and the outer surface. Each of the plurality of apertures includes one of each of a plurality of nozzles. A charge air recirculation tube is connected to the charge air recirculation outlet on the reservoir, and provides a flow path to the turbocharger compressor inlet duct, which provides the pressure differential needed to draw condensate from the charge air cooler into the reservoir.

A system for removing condensate from and enhancing the performance of a charge air cooler that includes a turbocharger, a charge air cooler having a condensate drain, a condensate reservoir having a condensate inlet, a condensate outlet, and a charge air recirculation outlet. The system also includes a condensate supply tube having a first end that is connected to the condensate drain and a second end that is connected to the inlet of the condensate reservoir. The system also includes a condensate dispersion tube connected to the outlet of the condensate reservoir. The system also includes a charge air recirculation tube, which recirculates charge air to the turbocharger compressor inlet, and provides the pressure differential needed to draw condensate out of the charge air cooler and into the reservoir.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
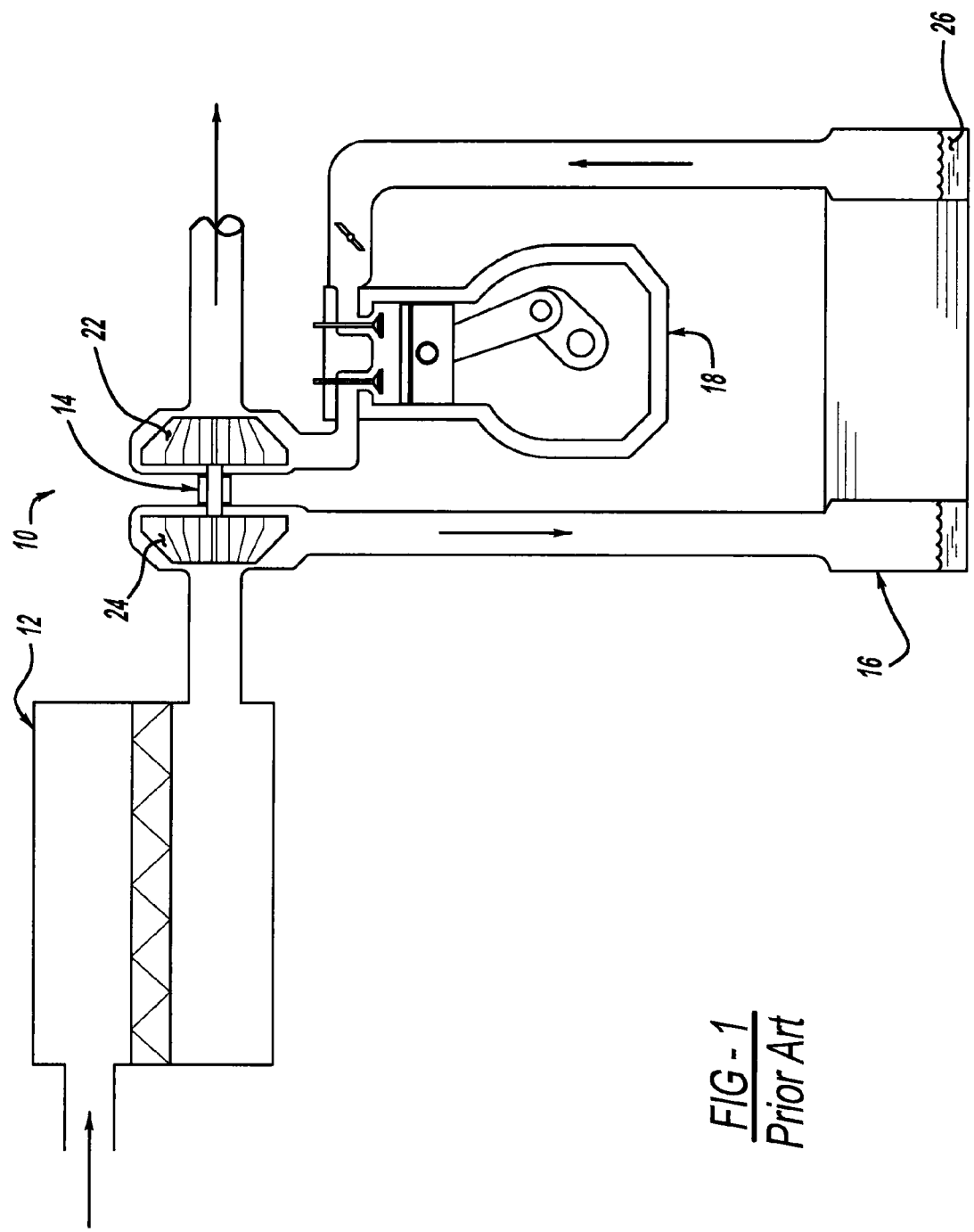
FIG. 1 is a schematic view of a turbocharged engine system including a charge air cooler according to the prior art.
Figure 2:
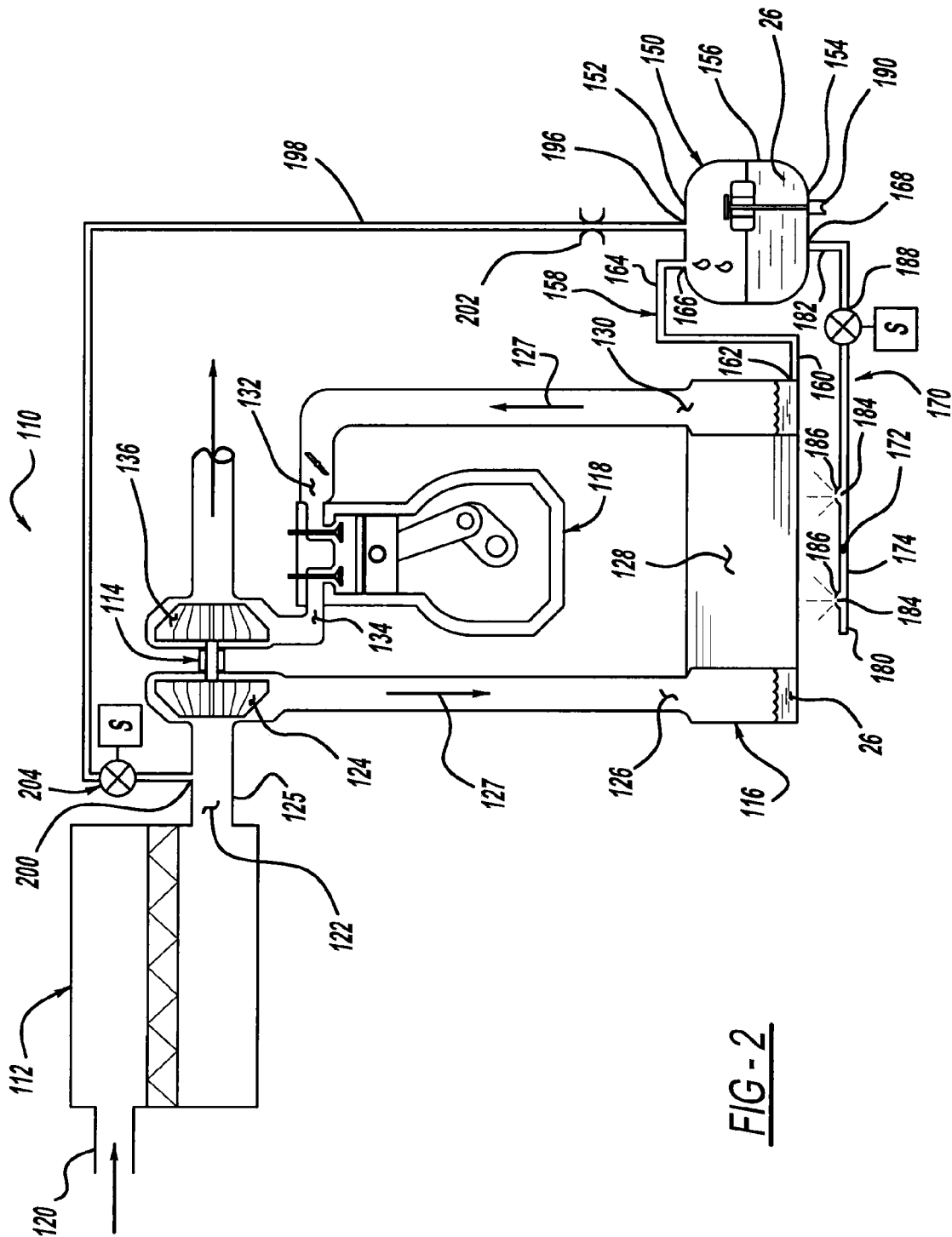
FIG. 2 is a schematic view of a turbocharged engine system including a charge air condensation separation and dispersion system in accordance with the present teachings.

Example embodiments will now be described more fully with reference to FIGS. 1-4. Corresponding reference numerals indicate corresponding parts throughout the several views of the drawings. FIG. 2 depicts a turbocharged engine system 110 within a vehicle 8, according to the present teachings. The turbocharged engine system 110 is similar to the turbocharged engine system 10 shown in FIG. 1 but includes additional structure to provide additional benefits. FIG. 2 depicts a charge air condensation separation and dispersion system to provide such additional benefits. The turbocharged engine system 110 includes an air intake filter housing 112, a turbocharger 114, a charge air cooler 116, and an engine 118. It is appreciated that a mechanically driven supercharger can be used in conjunction with the present teachings rather than a turbocharger 114.

Figure 3:
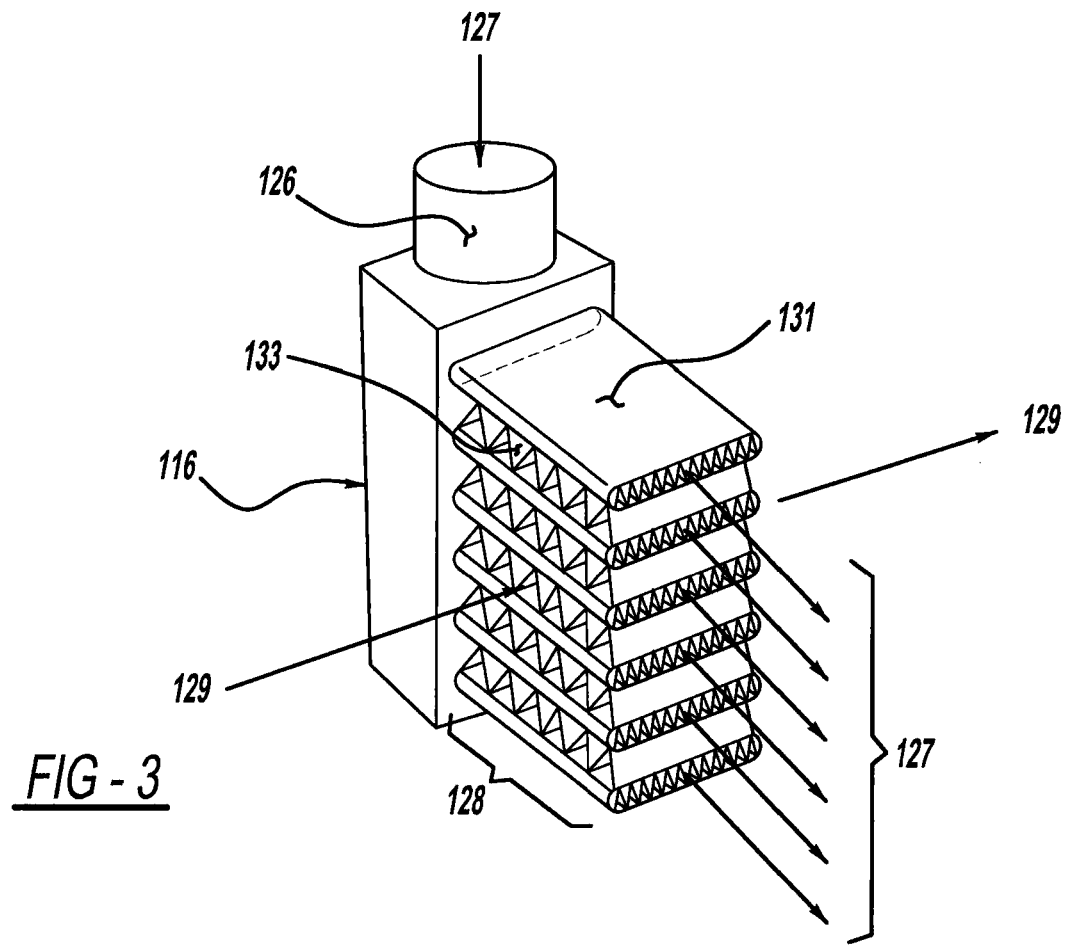
FIG. 3 is a view of the core portion of the charge air cooler.
Figure 4:
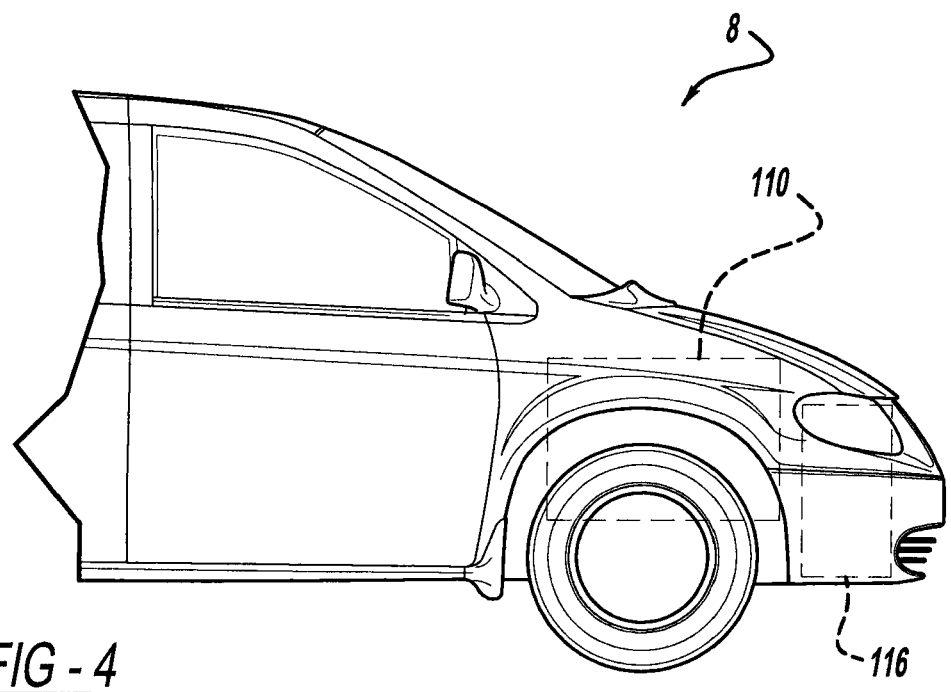
FIG. 4 is a side view of a vehicle depicting a location of the turbocharged engine system and the charge air cooler.

The air intake filter housing 112 includes an air inlet 120 and an air outlet 122. When the air exits the air outlet 122, it passes through the turbocharger compressor inlet duct 125, and then enters the turbocharger 114 and passes through a compressor 124 portion of the turbocharger 114 that compresses the intake air to increase the density of the intake air. The air exits the turbocharger 114 and enters a charge air cooler inlet 126. The compressor 124 forces the intake air (also known as charge air 127), through the charge air cooler 116 and into the engine when the engine intake valve is opened. Referring to FIG. 3, when a vehicle, within which the turbocharged engine system 110 is installed, is traveling upon a road and/or when a cooling fan in the vehicle is engaged, cooling air 129 flows over the fins 133 and exterior tube surfaces 131 of the core portion 128 of the charge air cooler 116. As the charge air 127 flows through the core portion 128, the temperature of the charge air 127 is reduced, which improves engine performance. The charge air 127 flowing through the charge air cooler 116 ultimately exits through a charge air cooler outlet 130 and flows into an intake portion 132 of the engine 118. After combustion occurs, the exhaust gas exits an exhaust portion 134 of the engine 118 and enters the turbocharger 114. Within the turbocharger, the hot exhaust gas drives a turbine 136, which turns a shaft to which the compressor 124 is attached, thereby driving the compressor 124.

The charge air condensation separation and dispersion system may include a condensate reservoir 150, which may be a hollow vessel having a top surface 152, a bottom surface 154, and a circumferential wall 156 formed therebetween. The condensate reservoir 150 may be connected to the charge air cooler 116 using a condensate supply tube 158. A first end 160 of the condensate supply tube 158 is connected to a condensate outlet 162 formed on or near the bottom of the charge air cooler 116. The condensate outlet 162 defined in the charge air cooler 116 is a drain that allows the condensate 26 to drain from the charge air cooler 116.

A second end 164 of the condensate supply tube 158 is connected to an inlet 166 of the condensate reservoir 150. The inlet 166 is formed near the top surface 152 of the condensate reservoir 150 to allow a maximum amount of condensate 26 to be stored in the condensate reservoir 150. A pressure differential between the compressor inlet duct 125 and the outlet 130 of the charge air cooler 116 is created when the engine 118 is running and forces the condensate out of the core portion 128 of the charge air cooler 116 and through the condensate supply tube 158 and into the condensate reservoir 150.

The condensate reservoir 150 includes a condensate outlet 168 formed near the bottom surface 154 of the condensate reservoir 150. A condensate dispersion tube 170 may be connected to the condensate outlet 168 of the condensate reservoir 150. The condensate dispersion tube 170 has an inner surface 172 and an outer surface 174 that defines a circumferential wall 180. Condensate 26 enters the condensate dispersion tube 170 at a first end 182 that is connected to the outlet 168 of the condensate reservoir 150. The circumferential wall 180 may include a plurality of apertures 184 formed through the circumferential wall 180 and receive one of a plurality of nozzles 186. Each one of the plurality of nozzles 186 enables the condensate 26 to spray onto large areas of the core portion 128 of the charge air cooler 116. The condensate dispersion tube 170 may be positioned parallel to the core portion 128 of the charge air cooler 116 to evenly distribute or spray the condensate 26 from the reservoir 150 onto the core portion 128. The condensate dispersion tube 170 may include a solenoid valve 188 that blocks air or condensate flowing through the condensate dispersion tube 170 when the valve 188 is in a closed position, but in an open position, the solenoid valve 188 allows the condensate to flow through the condensate dispersion tube 170 and out of each of the plurality of nozzles 186. The end of the condensate dispersion tube 170 farthest from the condensate reservoir 150 may be closed or sealed so that only the nozzles 186 may disperse condensate. By spraying the condensate water onto the core portion 128 of the charge air cooler 116 at high engine load conditions, the temperature of the charge air 127 can be reduced further than would have been possible without spraying water on to the core portion 128, thereby further enhancing engine performance. For applications where condensate dispersion alone is desired, without the charge air cooler 116 performance enhancement effect gained by spraying water on to the core portion 128, the condensate dispersion tube 170 may be a simple tube that drains directly to the ground.

The condensate reservoir 150 includes a single position level sensor 190 that is in communication with an engine control unit (ECU). When the condensate level in the condensation reservoir 150 is greater than a predetermined amount, the level sensor 190 may selectively generate a signal. The ECU may receive the signal and subsequently command the valve 188 to open, such as when the engine 118 is operating at high load conditions or high speed conditions. When the level sensor detects the condensate level is below the predetermined amount, the ECU will not allow the solenoid valve 188 to open, to prevent charge air from escaping from the system. It is appreciated that any of the vehicle control modules may be employed to control the valve 188, such as a body control module (BCM) or a Climate Control Panel (CCP) module. Control logic can also be shared between multiple modules. For example, the ECU could calculate load conditions and generate a load condition signal while a second module may receive the signal from the level sensor 190 and the load condition signal in order to determine whether or not to open or close the valve 188.

The ECU (or other modules) can provide a signal to the driver indicating when the condensate 26 is being dispersed onto the core portion 128 of the charge air cooler 116. The signal can be received by a first light (not shown) located near a driver information center or gauge cluster in a vehicle dash. The first light can power up and illuminate when the signal is generated, indicating that the condensate is being dispersed. A second light may be included and can be powered up and illuminate when the condensate level is less than a predetermined amount, indicating that the condensate reservoir 150 is low. Such indicator lighting can provide feedback to the vehicle operator as to when the performance enhancement function of spraying condensate water on to the core portion 128 of the charge air cooler 116 is engaged.

Additionally, the condensate reservoir 150 may employ a dual position level sensor (not shown) rather than a single position level sensor 190. The dual position level sensor may prevent overfilling of the condensate reservoir 150. For example, when the condensate level is greater than the predetermined minimum, the dual position level sensor may selectively generate a first signal. The ECU may receive the first signal and command the solenoid valve 188 to open when the engine 118 is operating at high load conditions where the air pressure in the turbocharger 114 and the charge air cooler 116 are elevated. When the condensate level is greater than a second predetermined amount, the dual position level sensor may selectively generate a second signal. The ECU may receive the second signal and command the solenoid valve 188 to open at a greater range of engine load and speed conditions, to prevent over-filling of the condensate reservoir 150. Alternatively, a pressure valve can be used in place of the solenoid valve 188. The pressure valve may open independently of the ECU when the engine 118 is operating at high load conditions, based solely on the pressure differential between the inside of the reservoir and the ambient atmospheric pressure. Means of preventing loss of charge air when the condensate reservoir 150 is empty, such as combining use of a float valve with the pressure valve, may be desirable in such an embodiment of the system.

The condensate reservoir 150 includes an air recirculation outlet 196 formed near the top surface 152. A recirculation tube 198 is connected to the air recirculation outlet 196 and an air recirculation inlet 200 positioned near the turbocharger 114. The recirculation tube 198 provides the pressure differential necessary to draw condensate out of the charge air cooler 116 and into the condensate reservoir 150. The recirculation tube 198 may include an orifice 202 that restricts the flow of air being recirculated. Additionally, the recirculation tube 198 can include a solenoid valve 204 ("S") that can be controlled by the ECU. For instance, the ECU can command the solenoid valve 204 to close when the engine 118 is operating at high load conditions, which prevents air flow recirculation.

The condensate reservoir 150 may receive condensate from additional sources. For example, the condensate reservoir 150 may receive condensate from the heating ventilation and air conditioning (HVAC) module (not depicted) by using a positive displacement pump to force the condensate from the HVAC module to the condensate reservoir 150. Additionally, the condensate reservoir may include a filler tube and cap (not shown) that would enable the driver to fill the condensate reservoir 150 during routine maintenance or while fueling the vehicle. Manually filling the condensate reservoir 150 would provide for uninterrupted charge air cooler performance enhancement available from spraying water on to the core portion 128 of the charge air cooler 116 because the condensate level would be maintained at a desired level by the manual fill procedure.

Stated slightly differently, what is disclosed is a system for separating and dispersing condensate formed in a charge air cooler 116. The system may employ a turbocharger 114 with the charge air cooler 116 connected to the turbocharger 114. Furthermore, a condensate drain 162 may be defined in a bottom of a vertical wall or on the bottom surface, relative to the ground, of the charge air cooler 116. A condensate reservoir 150 may define a condensate inlet 166, a condensate outlet 168, and a charge air recirculation outlet 196. A condensate supply tube 158 may have a first end that is directly connected to the condensate drain 162 of the charge air cooler 116 and a second end that is directly connected to the condensate inlet 166 of the condensate reservoir 150 to provide fluid communication therebetween. A condensate dispersion tube 170 may be directly connected to the condensate outlet 168 of the condensate reservoir 150 and have an inner surface and an outer surface that define a circumferential wall of the tube 170. The circumferential wall may define a plurality of apertures 184 in communication with the inner and the outer surfaces. A plurality of nozzles 186 may be directly attached over each of the plurality of apertures 184, that is, one nozzle 186 per aperture 184. The plurality of nozzles 186 may each define an opening to the atmosphere from the inner surface of the condensate dispersion tube 170. The condensate dispersion tube may be positioned adjacent a center portion of the charge air cooler 116, as depicted in FIG. 2.

Continuing, the system may employ an air recirculation tube 198 connected to the turbocharger compressor inlet duct 125 and directly to the condensate reservoir 150, the air recirculation tube 198 providing a path for air within the condensate reservoir 150 to flow to the turbocharger compressor inlet duct 125. A shut-off valve 204 may be connected directly to the air recirculation tube 198. The condensate drain 162 may be formed at a bottom of a vertical side wall or at the bottom surface of the charge air cooler 116 to enable condensation within the charge air cooler 116 to fully drain using the pressure differential between the charge air cooler 116 and the compressor inlet duct 125. A valve 188, such as a solenoid valve ("S") may be connected directly to the condensate dispersion tube 170 between the condensate reservoir 150 and the plurality of nozzles 186.

A condensate level sensor 190 may be directly connected to the condensate reservoir 150 and generate a signal when the level of condensate 26 is at a first predetermined level. The condensate level sensor 190 may generate a second signal when the condensate level is at a second predetermined level. The valve 188 may be controlled by either or both of the first signal or the second signal.

In another configuration, a system for separating and dispersing condensate formed in a charge air cooler 116 may employ a turbocharger 114 such that the charge air cooler 116 is connected to the turbocharger 114, a condensate drain 162 connected to the charge air cooler 116, a condensate reservoir 150 defining a condensate inlet 166, a condensate outlet 168, and a charge air recirculation outlet 196. A condensate supply tube 158 may have a first end that is directly connected to the condensate drain 162 and a second end that is directly connected to the condensate inlet 166 of the condensate reservoir 150 to provide fluid communication therebetween. Additionally, a condensate dispersion tube 170 may be connected to the condensate outlet 168 of the condensate reservoir 150. The condensate dispersion tube 170 may further employ an inner surface and an outer surface that define a circumferential wall. A plurality of apertures 184 may be defined through the circumferential wall with each of the apertures 184 employing a nozzle 186 to disperse the condensate from the reservoir 150. Alternately, the condensate dispersion tube 170 may drain directly to the ground without employing a plurality of apertures 184 with nozzles 186 if so desired.

The system may further employ an air recirculation tube 198 connected to the condensate reservoir 150 and the turbocharger compressor inlet duct 125, wherein the air recirculation tube provides the pressure differential between the charge air cooler 116 and the compressor inlet duct 125 necessary to draw condensate from the charge air cooler 116 into the condensate reservoir 150. A shut-off valve 204, which may be controlled by a solenoid, may be in or connected to the air recirculation tube 198 to control the flow of air in the tube. A condensate level sensor 190 may be connected to the condensate reservoir 150 may generate a first signal when the condensate level is at a first predetermined level within the reservoir 150 and a second signal when the condensate level is at a second predetermined level within the reservoir 150. A valve 188 may be connected to the condensate dispersion tube 170 to regulate condensate dispersion via the tube 170. The valve 188 may be controlled by a solenoid using signals, as mentioned above.

In yet another example, a system for separating and dispersing condensate 26 formed in a charge air cooler 116 of a turbocharged engine 118 may employ a turbocharger 114, a charge air cooler 116 connected to the turbocharger 114, a condensate drain 162 in a bottom of the charge air cooler 116, a condensate reservoir 150 having a condensate inlet 166, a condensate outlet 168, and a charge air recirculation outlet 196, a condensate supply tube 158 having a first end that is connected to the condensate drain 162 of the charge air cooler 116 and a second end that is connected to the condensate inlet 166 of the condensate reservoir 150. An air recirculation tube 198 may be connected to the condensate reservoir 150 and the turbocharger compressor inlet duct 125, the air recirculation tube 198 providing the pressure differential necessary to draw condensate from the charge air cooler 116 into the reservoir 150. Continuing, the system may also employ a solenoid-controlled shut-off valve 204 within the air recirculation tube to control airflow within the recirculation tube. The ECU or other control module(s) in the vehicle may control the solenoid of valve 204 to close during high engine load conditions to maximize charge air flow to the engine. The condensate level sensor 190 may be connected to the condensate reservoir 150 and generates a first signal when the condensate level is at a first predetermined level within the reservoir and a second signal when the condensate level is at a second predetermined level within the reservoir. A valve 188 may be connected to the condensate dispersion tube to regulate condensate dispersion based upon one of the first signal and the second signal.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system for separating and dispersing condensate formed in a charge air cooler, comprising:
    a turbocharger compressor inlet duct;
    a turbocharger attached to an engine;
    a charge air cooler connected to the turbocharger;
    a condensate drain defined in the charge air cooler;
    a condensate reservoir defining a condensate inlet, a condensate outlet, and a charge air recirculation outlet;
    a condensate supply tube having a first end that is directly connected to the condensate drain of the charge air cooler and a second end that is directly connected to the condensate inlet of the condensate reservoir, providing fluid communication therebetween;
    a condensate dispersion tube directly connected to the condensate outlet of the condensate reservoir, the condensate dispersion tube having an inner surface and an outer surface that defines a circumferential wall, the circumferential wall defining a plurality of apertures in communication with the inner and the outer surfaces;
    a plurality of nozzles, wherein one of each of the plurality of nozzles is connected to one of each of the plurality of apertures;
    a shut-off valve connected directly to the condensate dispersion tube between the condensate reservoir and the plurality of nozzles, the shut-off valve movable between a closed position where fluid flows through the condensate dispersion tube is prohibited and an open position where fluid flows through the condensate dispersion tube is allowed;
    a condensate level sensor directly connected to the condensate reservoir that generates a signal when a condensate level is at a first predetermined level;
    a control unit in communication with the shut-off valve, the control unit moving the shut-off valve to the closed position when the condensate is below the first predetermined level, the control unit moving the shut-off valve to the open position when the condensate is above the first predetermined level and when the engine is operating at high load conditions; and
    a charge air recirculation tube having a first end directly connected to the charge air recirculation outlet of the condensate reservoir and a second end connected to the turbocharger compressor inlet duct, providing a pressure differential necessary to draw condensate from the charge air cooler into the charge air cooler reservoir.

2. The system of claim 1, wherein:
    the plurality of nozzles each define an opening to the atmosphere from the inner surface of the condensate dispersion tube, and
    the condensate dispersion tube is positioned adjacent to a core portion of the charge air cooler.

3. The system of claim 1, further comprising:
    a shut-off valve connected directly to the air recirculation tube.

4. The system of claim 1, wherein the condensate drain is formed at one of a bottom of a vertical side wall or on a bottom surface of the charge air cooler to enable the charge air cooler to fully drain.

5. The system of claim 1, wherein the condensate level sensor generates a second signal when the condensate level is at a second predetermined level.

6. A system for separating and dispersing condensate formed in a charge air cooler, comprising:
    a turbocharger compressor inlet duct;
    a turbocharger attached to an engine;
    a charge air cooler connected to the turbocharger;
    a condensate drain connected to the charge air cooler;
    a condensate reservoir defining a condensate inlet, a condensate outlet, and a charge air recirculation outlet;
    a condensate supply tube having a first end that is connected to the condensate drain and a second end that is connected to the condensate inlet of the condensate reservoir to provide a fluid communication therebetween;
    a condensate dispersion tube connected to the condensate outlet of the condensate reservoir, the condensate dispersion tube further comprising an inner surface and an outer surface that define a circumferential wall, the circumferential wall further defining a plurality of apertures in communication with the inner surface and the outer surface;
    a charge air recirculation tube having a first end directly connected to the charge air recirculation outlet of the condensate reservoir and a second end connected to the turbocharger compressor inlet duct, providing a pressure differential necessary to draw condensate from the charge air cooler into the charge air cooler reservoir;
    a shut-off valve connected directly to the condensate dispersion tube, the shut-off valve movable between a closed position where fluid flows through the condensate dispersion tube is prohibited and an open position where fluid flows through the condensate dispersion tube is allowed;

a condensate level sensor directly connected to the condensate reservoir that generates a signal when a condensate level is at a first predetermined level; and a control unit in communication with the shut-off valve, the control unit moving the shut-off valve to the closed position when the condensate is below the first predetermined level, the control unit moving the shut-off valve to the open position when the condensate is above the first predetermined level and when the engine is operating at high load conditions.

7. The system of claim 6, further comprising:
a plurality of nozzles, wherein one of each of the plurality of nozzles is connected to one of each of the plurality of apertures.

8. The system of claim 6, further comprising:
a shut-off valve connected to the air recirculation tube.

9. A system for separating and dispersing condensate formed in a charge air cooler of a turbocharged engine system, comprising:
- a turbocharger compressor inlet duct;
- a turbocharger attached to an engine;
- a charge air cooler connected to the turbocharger;
- a condensate drain connected to a bottom of the charge air cooler;
- a condensate reservoir having a condensate inlet, a condensate outlet, and a charge air recirculation outlet;
- a condensate supply tube having a first end that is connected to the condensate drain of the charge air cooler and a second end that is connected to the condensate inlet of the condensate reservoir, providing a fluid communication therebetween;
- an air recirculation tube connected to the condensate reservoir and the turbocharger compressor inlet duct, wherein the air recirculation tube provides a pressure differential necessary to draw condensate from the charge air cooler into the reservoir;
- a shut-off valve within the air recirculation tube to control airflow within the recirculation tube;
- a condensate dispersion tube connected to the condensate outlet of the condensate reservoir, the condensate dispersion tube having an inner surface and an outer surface that define a circumferential wall, the circumferential wall defining a plurality of apertures through the inner surface and the outer surface;
- a plurality of nozzles, wherein one of each of the plurality of nozzles is connected to one of each of the plurality of apertures;
- a shut-off valve connected directly to the condensate dispersion tube between the condensate reservoir and the plurality of nozzles, the shut-off valve movable between a closed position where fluid flows through the condensate dispersion tube is prohibited and an open position where fluid flows through the condensate dispersion tube is allowed;
- a condensate level sensor directly connected to the condensate reservoir that generates a signal when a condensate level is at a first predetermined level; and
- a control unit in communication with the shut-off valve, the control unit moving the shut-off valve to the closed position when the condensate is below the first predetermined level, the control unit moving the shut-off valve to the open position when the condensate is above the first predetermined level and when the engine is operating at high load conditions.

10. The system of claim 9, wherein,
the condensate level sensor generates a second signal when the condensate level is at a second predetermined level within the reservoir.

11. A system for separating and dispersing condensate formed in a charge air cooler, comprising:
- a turbocharger compressor inlet duct;
- a turbocharger attached to an engine;
- a charge air cooler connected to the turbocharger;
- a condensate drain defined in the charge air cooler;
- a condensate reservoir defining a condensate inlet, a condensate outlet, and a charge air recirculation outlet;
- a condensate supply tube having a first end that is directly connected to the condensate drain of the charge air cooler and a second end that is directly connected to the condensate inlet of the condensate reservoir, providing a fluid communication therebetween;
- a condensate dispersion tube directly connected to the condensate outlet of the condensate reservoir, the condensate dispersion tube having an outlet to drain condensate directly to the ground;
- a charge air recirculation tube having a first end directly connected to the charge air recirculation outlet of the condensate reservoir and a second end connected to the turbocharger compressor inlet duct, providing the pressure differential necessary to draw condensate from the charge air cooler in to the charge air cooler reservoir;
- a shut-off valve connected directly to the condensate dispersion tube, the shut-off valve movable between a closed position where fluid flows through the condensate dispersion tube is prohibited and an open position where fluid flows through the condensate dispersion tube is allowed;
- a condensate level sensor directly connected to the condensate reservoir that generates a signal when a condensate level is at a first predetermined level; and
- a control unit in communication with the shut-off valve, the control unit moving the shut-off valve to the closed position when the condensate is below the first predetermined level, the control unit moving the shut-off valve to the open position when the condensate is above the first predetermined level and when the engine is operating at high load conditions.

12. The system of claim 11, further comprising:
a shut-off valve connected directly to the air recirculation tube.

13. The system of claim 11, wherein the condensate drain is formed at one of a bottom of a vertical side wall or a bottom surface of the charge air cooler to enable the charge air cooler to fully drain.

14. The system of claim 11, wherein the condensate level sensor generates a second signal when the condensate level is at a second predetermined level.

15. The system of claim 5, wherein the control unit moves the shut-off valve to the open position when the condensate level is at the second predetermined level.

16. The system of claim 6, wherein the condensate level sensor generates a second signal when the condensate level is at a second predetermined level.

17. The system of claim 16, wherein the control unit moves the shut-off valve to the open position when the condensate level is at the second predetermined level.

18. The system of claim 10, wherein the control unit moves the shut-off valve to the open position when the condensate level is at the second predetermined level.

19. The system of claim 14, wherein the control unit moves the shut-off valve to the open position when the condensate level is at the second predetermined level.

* * * * *